UNITED STATES PATENT OFFICE.

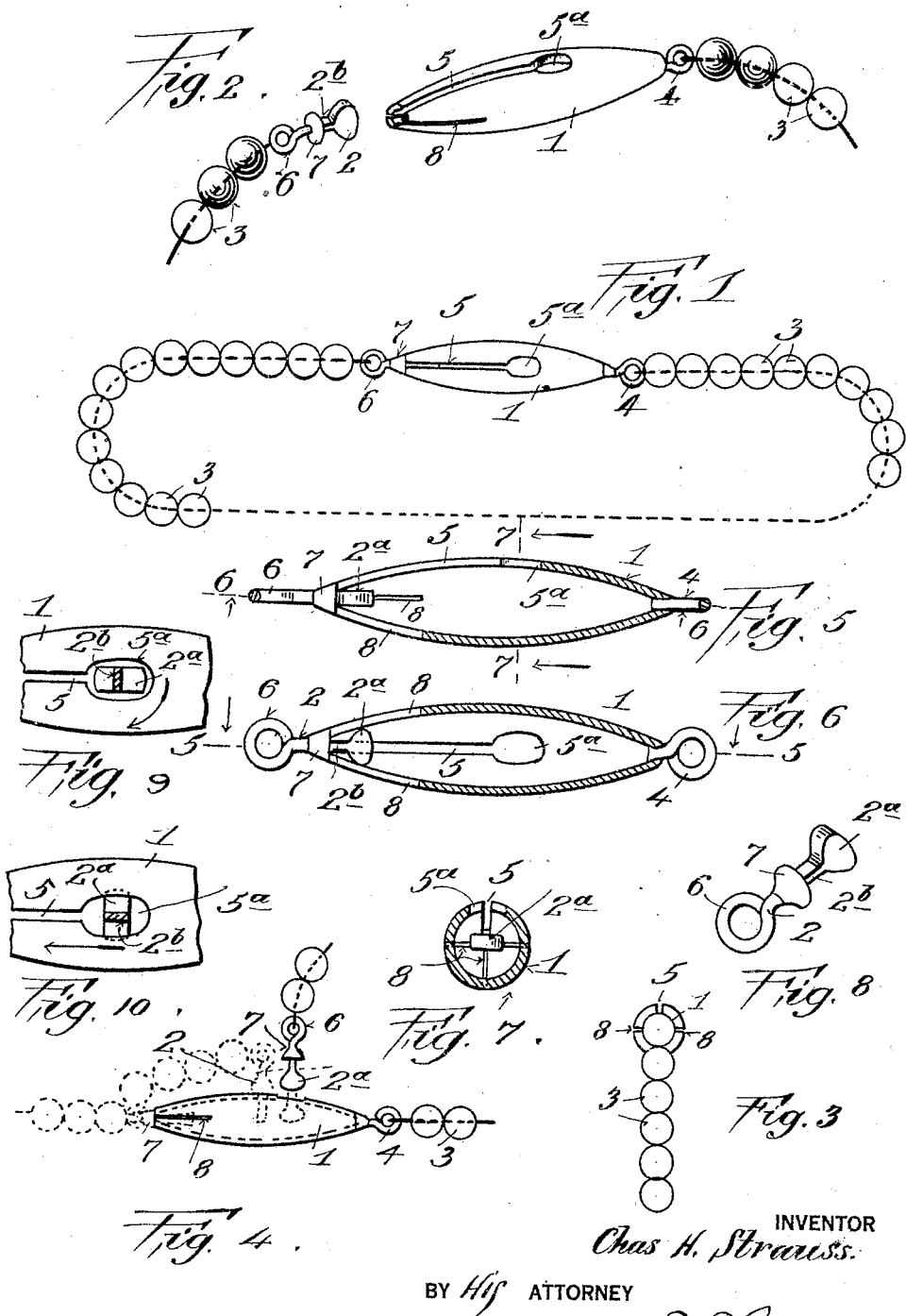

CHARLES H. STRAUSS, OF CEDARHURST, NEW YORK.

CLASP.

1,368,665.  Specification of Letters Patent.  Patented Feb. 15, 1921.

Application filed October 27, 1920. Serial No. 419,794.

*To all whom it may concern:*

Be it known that I, CHARLES H. STRAUSS, a citizen of the United States, and resident of Cedarhurst, in the county of Nassau and State of New York, have invented certain new and useful Improvements in Clasps, of which the following is a specification.

The object of my invention is to provide a clasp or fastener wherein complemental members may be readily attached together and detached, which members will not be liable to become detached in use, and which will be relatively strong and durable.

My invention comprises novel details of improvement that will be more fully hereinafter set forth and then pointed out in the claims.

Reference is to be had to the accompanying drawings forming part hereof, wherein—

Figure 1 is a side view illustrating my improvements in connection with a chain; Fig. 2 is a perspective detail view; Fig. 3 is an end view; Fig. 4 is a detail view illustrating the manner of assembling the members of the clasp; Fig. 5 is an enlarged section on the line 5—5 in Fig. 6; Fig. 6 is similar view on the line 6—6, in Fig. 5; Fig. 7 is a cross section on the line 7—7 in Fig. 5; Fig. 8 is a perspective view of one of the clasp members; Figs. 9 and 10 are enlarged detail views illustrating assembly position of the clasp members.

Similar numerals of reference indicate corresponding parts in the several views.

The numeral 1 indicates a relatively hollow main member of the clasp and 2 indicates a complemental member for detachable connection with member 1. Member 1 is adapted to be connected to a chain or other object 3. Said member is shown provided with an eye 4 at one end that may be secured to said member by solder or in any other suitable manner, to which eye the chain 3 may be attached at one end. A slot 5 extends longitudinally in the wall of member 1 and opens through the end thereof opposite eye 4. Said slot is shown terminating at the mid-portion of member 1 where the slot is enlarged at $5^a$, said enlarged part $5^a$ being shown longer in the direction of slot 5 than wide. The member 2 is provided with an enlarged head portion $2^a$ and a reduced shank portion $2^b$. The head $2^a$ is longer than wide to enter slot enlargement $5^a$ lengthwise (Fig. 9) and being longer than the width of enlargement $5^a$ to prevent withdrawal from the latter when in the position shown in Fig. 10, the head $2^a$ being adapted to travel within member 1. The shank $2^b$ of member 2 is thinner or narrower in one direction than another, the reduced or narrow dimension of shank $2^b$ being transverse to the length of head $2^a$ (Figs. 9 and 10). The greater dimension of shank $2^b$ prevents the entrance of the shank into slot 5 (Fig. 9), necessitating a one-quarter rotation of member 2 to present the narrow portion of shank $2^b$ in position to slide in slot 5 when the head $2^a$ of member 2 is within member 1. Member 2 is shown adapted for connection with chain 3 by means of an eye or loop 6 at the end of said member opposite head $2^a$. Member 2 is also shown provided with an enlargement 7 between shank $2^b$ and eye 6 adapted to engage the outer end of member 1 when members 1 and 2 are assembled for use. The operating face of enlargement 7 is shown flat to engage the correspondingly flat end of member 1. By preference member 1 is provided with one or more slots 8 in its wall spaced from slot 5 and opening through the adjacent end of member 1 to provide resilient jaw-like portions at the end of said member.

When the clasp members are to be assembled the head $2^a$ of member 2, in its lengthwise direction, is pushed through slot enlargement $5^a$ (Figs. 4 and 9), the enlargement 7 retaining shank $2^b$ opposite slot 5. Member 2 is next given a one-quarter turn to present the narrow part of shank $2^b$ to slot $5^a$ and member 2 is pushed along member 1, the shank $2^b$ sliding in slot 5 to its outer end. When head $2^a$ reaches the limit of its travel and engages the wall of member 1 the member 2 is swung from a position transverse to the length of member 1 to a position in the longitudinal axis of said member, the enlargement 7 sliding and crowding over the end of member 1. With the parts in the position described the head 2ª cannot pull out of member 1 as said head is larger than the reduced end of said member and the parts remain connected for use, the head 2ª and enlargement 7 bearing simultaneously against member 1 serving to frictionally retain the members together. When members 1 and 2 are to be detached the operations described are reversed, the member 2 being swung outwardly and slid along slot 5 to enlargement 5ª and then given a one-quarter turn to permit head 2ª to be pulled out of said enlargement. The arrangement of head 2ª and shank 2ᵇ, as described, is such that so long as said shank is in slot 5 the members 1 and 2 cannot become detached because head 2ª is then transverse to the slot and cannot pass therethrough, thereby preventing accidental disconnection of the parts.

While I have shown member 1 in elongated tubular form tapering toward opposite ends, it will be understood that said member may be in any other desired form with slot 5, 5ª permitting the described operations of member 2.

Having now described my invention, what I claim is:

1. A clasp comprising complemental members, one of said members having a slot provided with an enlargement at one end, the other member having a head to enter said slot in one direction only, said head being of greater dimension in one direction than the width of said slot and enlargement, the last named member having a portion at an angle to the greater dimension of said head to enter said slot and prevent withdrawal of the head therethrough.

2. A clasp comprising complemental members, one of said members having a slot provided with an enlargement at one end, the other member having a head to enter said slot in one direction only, and having a portion longer at an angle to the length of said head than the width of the slot, said slot at its end opposite said enlargement opening through an end of the corresponding member.

3. A clasp comprising complemental members, one of said members having a slot provided with an enlargement at one end, the other member having a head to enter said slot in one direction only, said member having a shank sufficiently narrow in one direction to enter said slot and longer in another direction than the width of said slot, the longer dimension of the shank being at an angle to the longer dimension of the head.

4. A clasp comprising complemental members, one of said members having a slot provided with an enlargement at one end, the other member having a head to enter said slot enlargement in one direction only, said member having a shank sufficiently narrow in one direction to enter said slot and longer in another direction than the width of said slot, the greater dimension of the shank being at an angle to the greater dimension of the head, said member having an enlargement on the side of the shank opposite said head to oppose the slotted member.

5. A clasp comprising complemental members, one of said members having a slot provided with an enlargement at one end, the other member having a head to enter said slot in one direction only, said member having a shank sufficiently narrow in one direction to enter said slot and longer in another direction than the width of said slot, said member having an enlargement on the side of the shank opposite said head to oppose the slotted member, said last named member having a slot spaced from the first named slot providing jaws at the adjacent end of the member.

6. A clasp comprising complemental members, one of said members being in elongated hollow form having a slot in its wall opening through one end of the member and having an enlargement remote from said end, the other member having a head longer than the width of said slot and its enlargement and having a shank longer in one direction and narrower in another direction than the width of said slot.

7. A clasp comprising complemental members, one of said members being in elongated hollow form having a slot in its wall opening through one end of the member and having an enlargement remote from said end, the other member having a head longer than the width of said slot and its enlargement and having a shank longer in one direction and narrower in another direction than the width of said slot, the second named member having an enlargement on the side of said shank opposite the head to oppose the end of the first named member.

8. A clasp comprising complemental members, one of said members being in hollow form having a reduced end and provided with a slot in its wall opening through said reduced end, the other member having a portion to enter said slot longer in one direction than the width of the slot and having a head greater in a direction at an angle to said longer portion than the width of said slot and greater than the transverse dimension of the reduced end of the other member to engage the latter to prevent withdrawal from the latter.

9. A clasp comprising complemental members, one of said members being in hollow form having a reduced end and provided with a slot in its wall opening through said reduced end, the other member having a portion to enter said slot and having a head greater in one direction than the width of said slot and greater than the transverse dimension of the reduced end of the other member to engage the latter to prevent withdrawal from the latter, the second named member having an enlargement spaced from said head adapted to engage the end of the first named member.

Signed at New York city, in the county of New York, and State of New York, this 25th day of October, A. D. 1920.

CHARLES H. STRAUSS.